US007438402B2

(12) United States Patent
Jones et al.

(10) Patent No.: US 7,438,402 B2
(45) Date of Patent: Oct. 21, 2008

(54) ROLLING INK STICK

(75) Inventors: Brent R. Jones, Tualatin, OR (US); David L. Knierim, Wilsonville, OR (US); Barry D. Reeves, Lake Oswego, OR (US); Edward F. Burress, West Linn, OR (US); Ernest I. Esplin, Sheridan, OR (US); Richard G. Chambers, Portland, OR (US); Jasper Wong, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 305 days.

(21) Appl. No.: 11/324,564

(22) Filed: Jan. 3, 2006

(65) Prior Publication Data

US 2007/0153068 A1 Jul. 5, 2007

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85, 95
See application file for complete search history.

(56) References Cited

U.S. PATENT DOCUMENTS

| | | | | |
|---|---|---|---|---|
| 5,181,049 | A | 1/1993 | Mackay et al. | |
| D335,683 | S | 5/1993 | Smith | |
| D346,821 | S | 5/1994 | Smith | |
| 5,455,604 | A | 10/1995 | Adams et al. | |
| 5,734,402 | A | 3/1998 | Rousseau et al. | |
| 5,805,191 | A | 9/1998 | Jones et al. | |
| 5,861,903 | A | 1/1999 | Crawford et al. | |
| 6,409,327 | B1 * | 6/2002 | Koeleman et al. | 347/88 |
| 6,422,694 | B1 | 7/2002 | Hollands | |
| 6,601,950 | B2 * | 8/2003 | Hollands et al. | 347/88 |
| 6,709,094 | B2 | 3/2004 | Jones | |
| 6,746,113 | B1 * | 6/2004 | Leighton et al. | 347/88 |
| 6,840,612 | B2 * | 1/2005 | Jones et al. | 347/88 |
| 7,018,033 | B2 * | 3/2006 | Joppen | 347/88 |
| 7,380,928 | B2 * | 6/2008 | Leighton | 347/99 |
| 2003/0063138 | A1 * | 4/2003 | Varnon et al. | 347/1 |

* cited by examiner

*Primary Examiner*—Stephen D Meier
*Assistant Examiner*—Leonard S. Liang
(74) *Attorney, Agent, or Firm*—Maginot, Moore & Beck

(57) ABSTRACT

An ink stick for use in a phase change ink jet printer is provided wherein the ink jet printer has an ink feed channel having a feed direction leading to a melt plate. The ink stick comprises an ink stick body having an external surface and an axis of rotation. The ink stick body is adapted for insertion into the ink feed channel so that the axis of rotation is oriented substantially perpendicular to the feed direction. The external surface of the ink stick body forms a circle on a plane that is substantially perpendicular to the axis of rotation.

25 Claims, 11 Drawing Sheets

ROLLING INK STICK

TECHNICAL FIELD

This disclosure relates generally to ink printers, the ink sticks used in such ink printers, and the devices and methods used to provide ink to such printers.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed or urged by a spring through the feed chute toward a melt plate in the heater assembly. The melt plate melts the solid ink impinging on the plate into a liquid that is delivered to a print head for jetting onto an image receiving medium, such as an intermediate transfer surface. U.S. Pat. No. 5,734,402 for a Solid Ink Feed System, issued Mar. 31, 1998 to Rousseau et al.; U.S. Pat. No. 5,861,903 for an Ink Feed System, issued Jan. 19, 1999 to Crawford et al.; and U.S. Pat. No. 6,709,094 for a Load and Feed Apparatus for Solid Ink, issued Mar. 23, 2004 to Jones describe exemplary systems for delivering solid ink sticks into a phase change ink printer.

A color printer typically uses four colors of ink (yellow, cyan, magenta, and black). Ink sticks of each color are delivered through corresponding feed channels to a melt plate. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. A key plate has keyed openings to aid the printer user in ensuring that only ink sticks of the proper color are inserted into each feed channel. Each keyed opening of the key plate has a unique shape. The ink sticks of the color for that feed channel have a shape corresponding to the shape of the keyed opening. The keyed openings and corresponding ink stick shapes exclude from each ink feed channel ink, sticks of all colors except the ink sticks of the proper color for that feed channel.

Ink sticks are generally cubic in volume and formed with one or more key elements. These key elements are protuberances or indentations that are located in different positions on an ink stick. In some cases, the key elements are placed on different sides of ink sticks of different colors that are included in an ink stick set. This allows for detection and identification of the different ink sticks, particularly during loading, as noted above. For instance, corresponding keys on the perimeters of the openings through which the ink sticks are inserted into their appropriate feed channel exclude ink sticks of the set, particularly those of different colors, which do not have the appropriate perimeter key element.

An ink stick is typically pushed or slid along the feed channel by the feed mechanism until it reaches the melt plate. However, the sticky nature of an ink stick's waxy exterior surface generates friction as the ink stick is pushed along the channel. This friction may cause stick-slip movement of the ink stick and the ink stick may hang up or catch within the feed channel. The friction encountered by an ink stick increases in proportion to the number of ink sticks that are in the feed channel. Problems also arise from an ink stick being incorrectly oriented within a correct feed channel. The misorientation of such an ink stick may be difficult for an operator to detect so the troublesome stick can be removed.

Some provisions have been made to prevent the solid masses of shaped ink from sticking to the sides of the feed chutes so that an unrestricted feed of ink sticks proceeds down the channel to the heater plate for melting. For instance, the feed channel and/or the ink stick may include cooperating alignment and orientation features that facilitate alignment of the generally rectangular cross-section ink sticks in the feed channel so the possibility of jamming due to skewing of the ink stick is reduced.

The areas on a typical ink stick for keying and guiding elements are typically small. Simply increasing the size of a stick to accommodate additional features is not beneficial because the lateral dimensions of the ink stick must not exceed the dimensions of the corresponding keyed opening or feed channel for the ink stick. While the small size allows improved resolution for topping off the ink supply when replenishing ink, an operator must supply a greater number of the ink sticks into the feed channel of the phase change ink printer, which increases the work load of the operator. As phase change ink printers have increased their printing speed, the smaller ink sticks must be replaced at an even greater rate.

Therefore, other methods for improving the efficiency of delivering solid ink sticks along the feed channel to the melt plate would be useful.

SUMMARY

An ink stick for use in a phase change ink jet printer includes an ink stick body having an external surface and an axis of rotation. The ink stick body is adapted for insertion into the ink feed channel of the printer so that the axis of rotation is oriented substantially perpendicular to the feed direction of the feed channel. At least a first portion of the external surface of the ink stick body forms a circle on a plane that is substantially perpendicular to the axis of rotation, and a second portion of the external surface in a plane that is also substantially perpendicular to the axis of rotation contains a feature element. In embodiments, the feature element is a guide element, such as a notch or a flange. In other embodiments, the feature element is a key element.

An ink stick for use in a phase change ink jet printer includes an ink stick body having an external surface and an axis of rotation. A guide portion of the external surface is adapted to engage a guide rail oriented somewhat perpendicular to gravitational force in a feed channel of the phase change ink jet printer, to guide the ink stick in a feed direction along the feed channel. The guide portion of the external surface has a substantially circular circumference, centered on the axis of rotation.

A set of solid ink sticks for use in a phase change ink jet printer having first and second feed channels includes a first ink stick body having a first portion centered about an axis of rotation, and a second ink stick body having a second portion centered about an axis of rotation. The outer surface of the first portion has a shape different from the shape of the outer surface of the second portion. The outer surface of the first portion is adapted to fit in the first feed channel of the phase change ink jet printer, and the outer surface of the second portion is adapted to fit in the second feed channel of the phase change ink jet printer.

A method of inserting ink sticks into one of a plurality of feed channels of a phase change ink jet printer, wherein each feed channel has an insertion end and a melt end, with a feed direction extending from the insertion end toward the melt end, and wherein the insertion end has an insertion opening having a unique shape, includes identifying an axis of rotation for an ink stick, orienting the ink stick so that the axis of rotation is substantially perpendicular to the feed direction, and confirming that the outer shape of the ink stick is substantially the same as the shape of the insertion opening. The method further includes inserting the ink stick through the insertion opening into the insertion end of the feed channel, and rolling the first ink stick along the first feed channel along the feed direction toward the melt end with the axis of rotation of the ink stick remaining substantially perpendicular to the feed direction.

DETAILED DESCRIPTION

Figure 1:
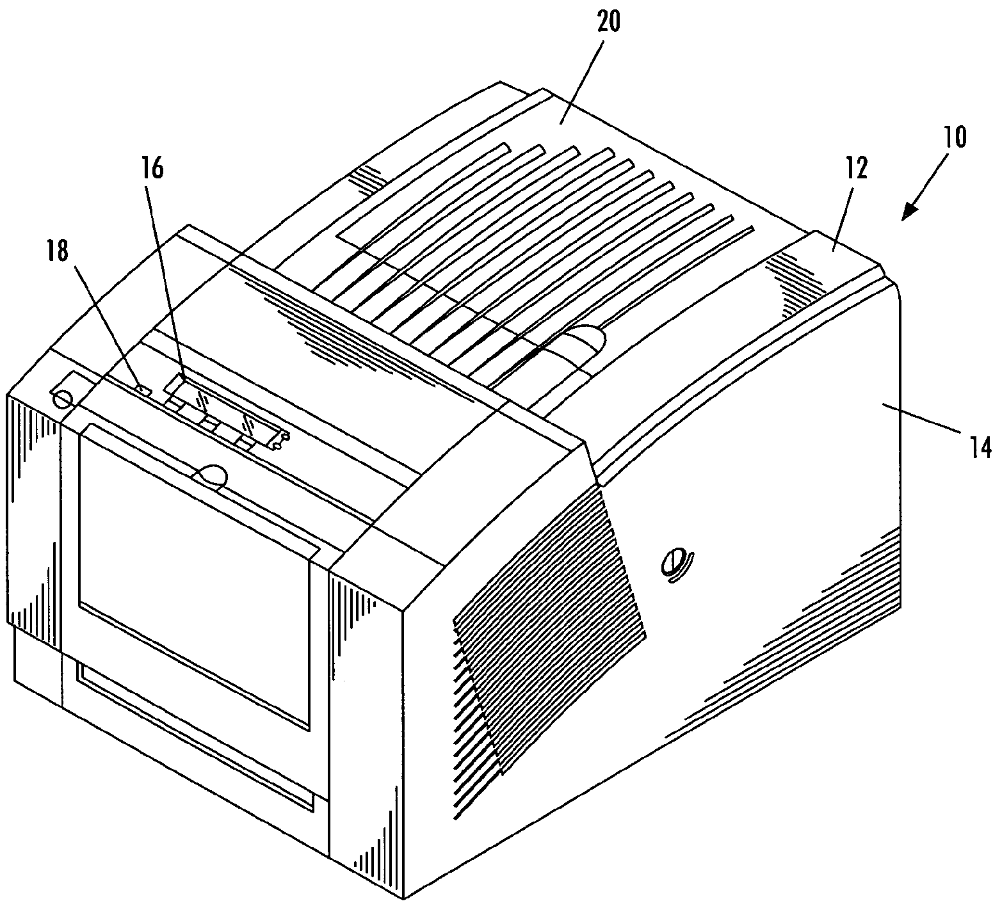
FIG. 1 is a perspective view of a phase change printer with the printer top cover closed.
Figure 2:
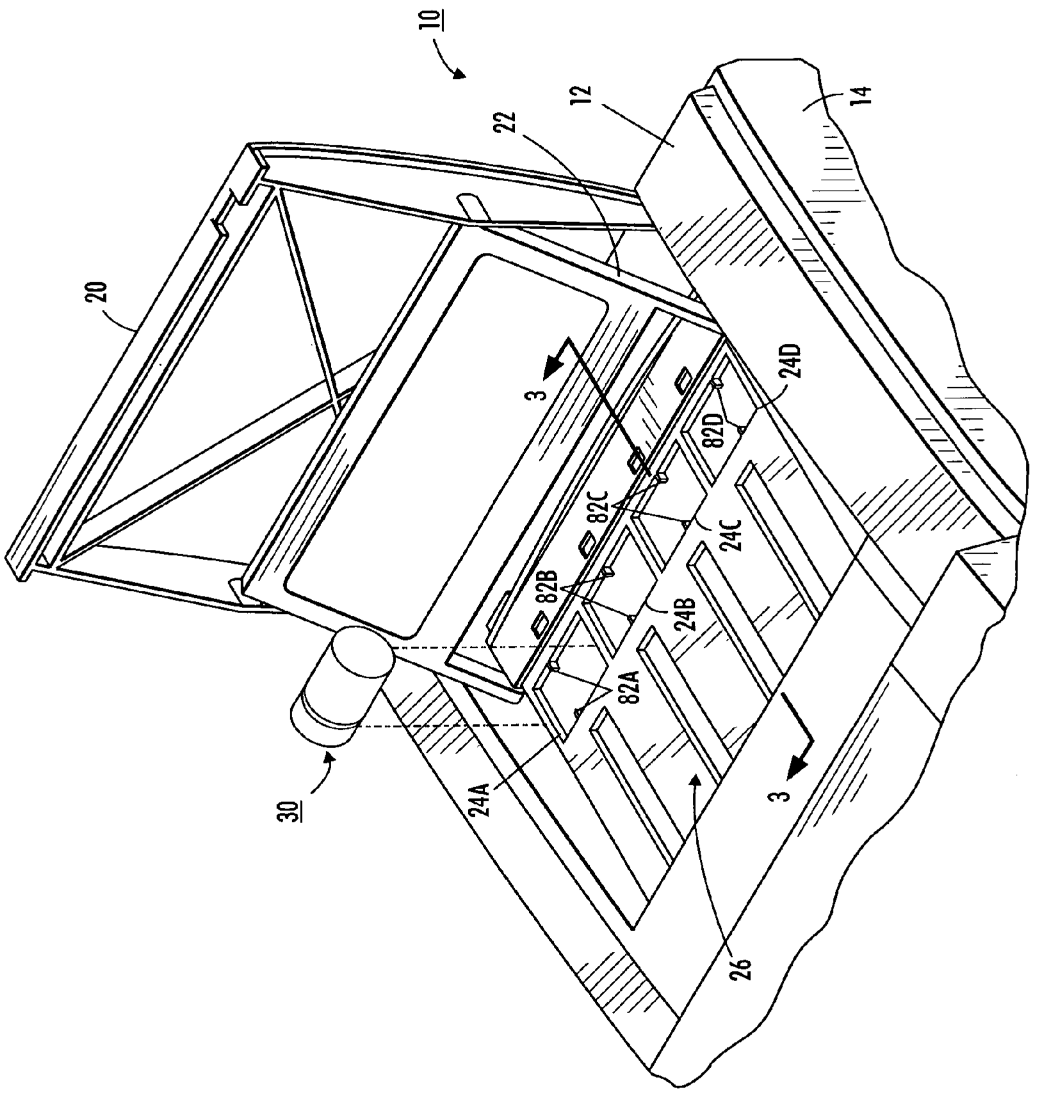
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. Such a printing mechanism is described in U.S. Pat. No. 5,805,191, entitled Surface Application System, to Jones et al, and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

In previously known printers, the ink access cover 20 may be attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below.

Figure 3:
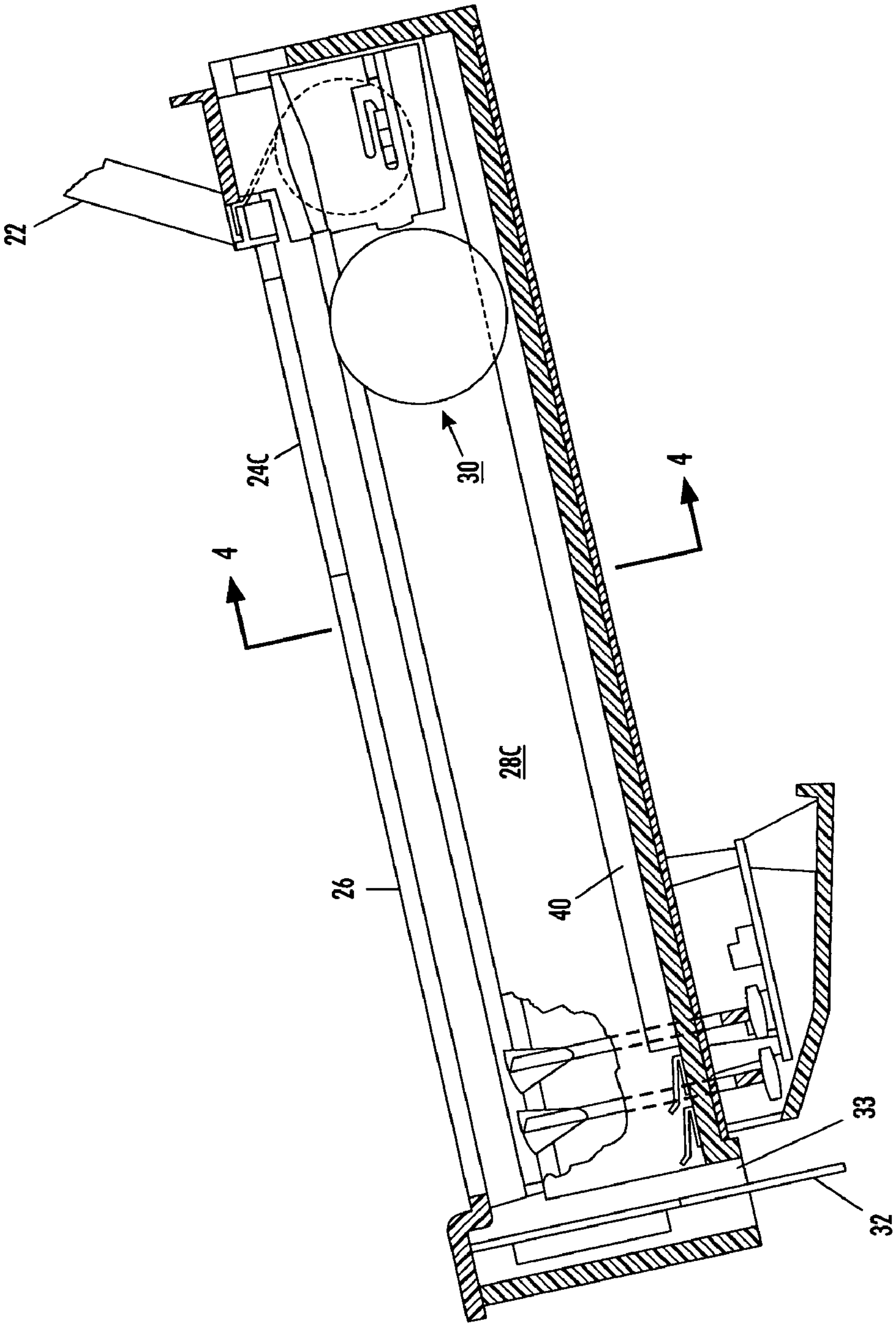
FIG. 3 is a side sectional view of a feed channel of a solid ink feed system taken along line 3-3 of FIG. 2.

These printers use a constant force spring to urge solid, generally cubic ink sticks down the feed channel. These printers are subject to the stick-slip movement discussed previously. As shown in FIG. 2, a key plate 26 may be formed with keyed openings 24A-D each of which is shaped to accommodate spherical or cylindrical ink sticks 30. Such a printer may, as shown in FIG. 3, incorporate a feed channel having a sloped floor so that gravity moves the ink stick in a rolling fashion through the feed channel to the melt plate. The rolling motion reduces friction and, hence, reduces the possibility of stick-slip movement and catching of the rolling ink stick in the feed channel.

Referring to FIG. 3, each longitudinal feed channel 28A-D delivers ink sticks 30 of one particular color to a corresponding melt plate 32. Each feed channel 28 has a longitudinal feed direction from the insertion end of the feed channel 28 to the melt end of the feed channel that is sloped toward the melt plate. Alternatively, the feed channel may be substantially perpendicular to gravitational force. In this embodiment, gravitational force does not propel the ink stick along the feed channel. A constant force spring and/or a push block urge the rolling ink stick along the feed channel. The pressure of the spring or push block on the ink stick should not be so great as to interfere with the rolling motion of the ink stick along the feed channel.

The melt end of the feed channel 28 is adjacent the melt plate 32. The melt plate melts the solid ink stick into a liquid form. The melted ink drips through a gap 33 between the melt end of the feed channel 28 and the melt plate, and into a liquid ink reservoir (not shown). Each feed channel 28A-D has a longitudinal dimension from the insertion end to the melt end, and a lateral dimension, substantially perpendicular to the longitudinal dimension.

A color printer typically uses four colors of ink (yellow, cyan, magenta, and black). Ink sticks 30 of each color are delivered through a corresponding individual one of the feed channels 28A-D. The operator of the printer exercises care to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 4:
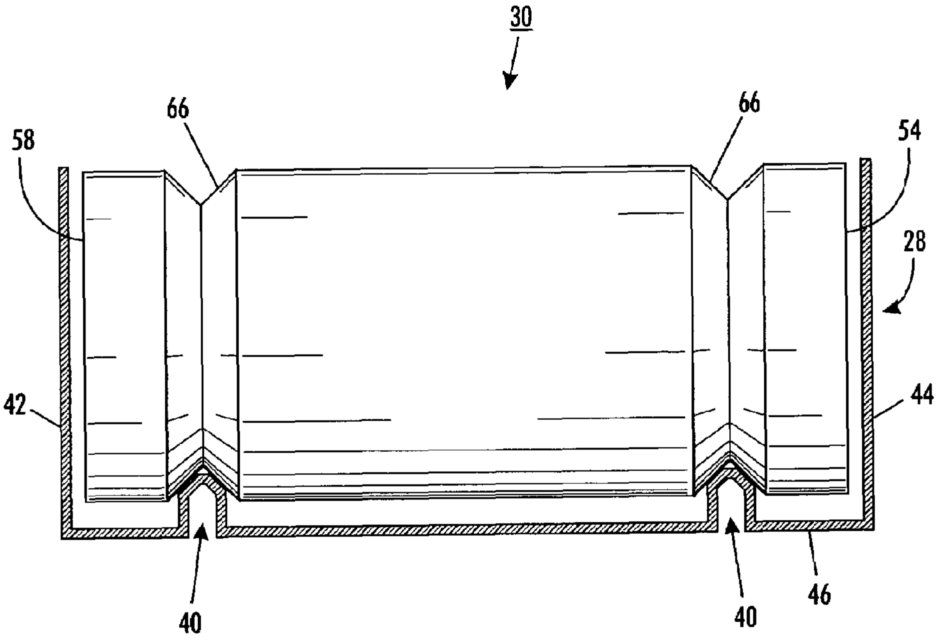
FIG. 4 is a simplified cross-sectional view of a feed channel taken along line 4-4 of FIG. 3.

Referring next to FIG. 4, the feed channel 28 is defined by lateral channel side walls 42, 44 that are substantially vertical, and a channel bottom 46. The transverse dimension is between the lateral side walls 42, 44. A pair of longitudinal feed channel guide rails 40 is included in a lower portion of the feed channel, preferably near the bottom of the feed channel. The feed channel guide rails 40 are substantially evenly spaced apart and parallel in the lateral dimension in the feed channel, as shown in FIG. 4, so that they are aligned with the central longitudinal axis of the feed channel. The guide rails 40 are designed to receive the guide portions of an ink stick. The exemplary feed channel guide rail illustrated is approximately the shape of an inverted "V" with a truncated peak, so that the width of the feed channel guide rail 40 at its peak is substantially less than the width of the feed channel between the side walls 42, 44. While a guide rail is shown, other means and methods of guiding ink sticks along the feed channel are contemplated. By way of non-limiting examples, a guide groove may be used. In this embodiment, the feed channel includes a pair of longitudinal feed channel grooves in the base of the feed channel. The ink stick for use with a feed channel having guide grooves would include raised portions such as disk-like protrusions or flanges. The guide grooves would receive the disk-like protrusions or flanges of the ink stick.

Figure 5:
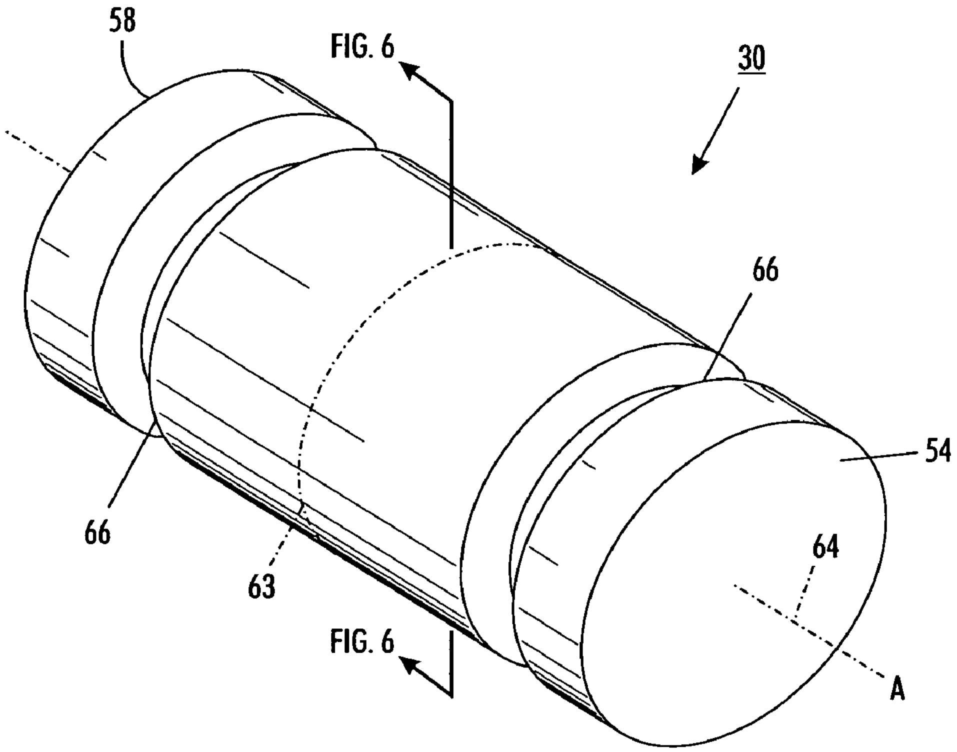
FIG. 5 is a perspective view of one embodiment of a solid ink stick.
Figure 6:
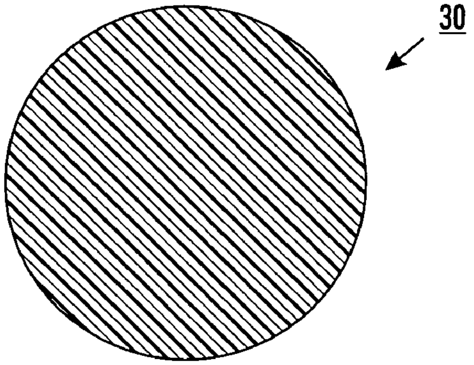
FIG. 6 is a cross-sectional elevational view of the ink stick taken along line 6-6 of FIG. 5.

An embodiment of a solid ink stick 30 for use in the feed channel with the feed channel guide rail comprises a rolling ink stick as shown in FIGS. 5 and 6. The ink stick is formed of a three dimensional ink stick body comprising an external surface 54 having an axis of rotation A. As shown in FIG. 6, a cross-section of the external surface taken along 6-6 of FIG. 5 of the ink stick body forms a circle on a plane that is substantially perpendicular to the axis of rotation. The ink stick body 30 is adapted for insertion into a corresponding ink feed channel 28A-D so that the axis of rotation is oriented substantially perpendicular to the longitudinal feed direction of the feed channel 28A-D. In some embodiments, the ink stick body 30 is adapted for insertion into a corresponding ink feed channel so that the axis of rotation is oriented substantially perpendicular to gravitational force. In some embodiments, the ink stick is inserted in an insertion direction into the feed channel, and the axis of rotation is substantially perpendicular to the insertion direction. The ink stick 30 is illustrated without the keying features that correspond to the key plate openings 24A-D through the key plate 26, to simplify the illustration. The ink stick body may be formed by pour molding, injection molding, compression molding, or other known techniques.

As shown in the embodiment of FIG. 5, the ink stick may be formed having a substantially cylindrical body comprising two lateral ends 54, 58, which the lateral ends 54, 58 are substantially circular and parallel to one another with a common axis. The axis of rotation A of the cylindrical ink stick body 30 corresponds to the longitudinal axis of the cylindrical body. Referring to FIG. 4, the cylindrical ink stick 30 is configured to fit into the feed channel 28 with the two lateral ends 54, 58 of the ink stick body 30 oriented along the transverse or lateral dimension of the feed channel 28 with the axis of rotation substantially perpendicular to the longitudinal feed direction of the feed channel. It should be noted that, in this embodiment, the external surface 54 of the ink stick body need not be straight, as with a perfect cylinder. The external surface 54 could have a spherical, barrel, frusto-conical or hyperboloid shape about the axis of rotation. The ink stick body 30 could have inward or outward angles, curves, disk-like protrusions or flanges which may be employed to enhance the ability to provide keying. Although the basic sphere shape offers reduced opportunity for keying features, one or more grooves or steps could be included for keying or guiding. This limitation may be acceptable in some applications because the spherical shape provides an additional advantage of being easily directed to follow any non-linear paths, including direction changes. Therefore, the feed channel need not be straight if the ink stick is a sphere.

The ink stick body 30 has a lateral center of mass 63 between the lateral ends 54, 58 of the body, and a vertical center of mass 64 corresponding to the axis of rotation of the ink stick body 30. If the ink stick body 30 has a substantially uniform weight density, and is substantially cylindrical in shape, the lateral center of mass 63 is approximately midway between the lateral ends 54, 58 of the ink stick body. The lateral center of mass 63 is identified in the ink stick body without any key shape elements that may be formed in the lateral side surfaces of the ink stick body.

The outermost lateral dimension of the ink stick body is only fractionally smaller than the lateral dimension of the ink stick feed channel 28. For example, the ink stick body has a longitudinal dimension between the lateral ends 54, 58 (not including protruding insertion key or orientation elements) of between approximately 1.1 and 1.8 inches (28-46 mm), such as 1.5 inches (37 mm). The ink stick body may have a diameter at the widest point along the axis of rotation of the ink stick body (not including protruding insertion key or orientation elements) of between approximately 1.0 and 1.5 inches (25-38 mm), such as 1.25 inches (32 mm). The lateral dimension of the ink stick feed channel 28 between the side walls 42, 44 may be approximately 0.004 to 0.08 inches (0.1-2.0 mm) wider than the longitudinal dimension of the ink stick body.

As shown in FIG. 5, the ink stick body may further include a pair of guide portions 66. In the exemplary embodiments, each guide portion 66 comprises a notch or groove formed about the circumference of the external surface 54 of the ink stick body 30 centered on the axis of rotation. The guide portions 66 are spaced apart on the external surface of the ink stick body along the axis of rotation. The guide portions 66 are formed where a plane perpendicular to the axis of rotation intersects the external surface of the ink stick body. In embodiments where there are two guide portions, the separation between the guide portions 66 may be approximately one third to one half the ink stick body length. The location of the guide portions 66 along the external surface 54 of the ink stick body 30 may correspond to the location of the guide rails 40 in the feed channel 28. Thus, substantially the only contact between the external surface 54 of the ink stick body 30 and the feed channel 28 is the contact between the guide portions 66 of the ink stick body 30 and the guide rails 40 in the feed channel (See FIG. 4). This feature raises the majority of the ink stick body 30 above the base of the feed channel 28 so that small particles of ink debris from previously used ink sticks that have accumulated in the feed channel 28 would be less likely to become an obstruction.

The guide portions 66 formed in the external surface 54 of the ink stick body 30 and the feed channel guide rails 40 in the feed channel 28 cooperate to maintain the orientation of the ink stick 30 in the feed channel 28 such that the axis of rotation of the ink stick body remains perpendicular to the feed direction. This orientation allows the ink stick to move about its axis of rotation and roll as it progresses along the length of the feed channel 28 from the insertion end to the melt end. As mentioned above, feeding the ink by pushing it along in a sliding fashion generates friction force which can result in stick-slip movement along the feed channel 28 or the ink stick 30 could hang up or catch within the feed channel 28. This problem is compounded due to the sticky nature of the ink sticks' waxy exterior surfaces as well as laterally offset pressure that may be exerted by the push block on a sliding ink stick. By providing a feed channel that is sloped toward the melting plate, the ink stick is rolled along the feed channel by gravitational force. Thereby, friction force is reduced and stick-slip motion and jams are less likely to occur.

The guide portions 66 of the exemplary embodiment are shown as a pair of grooves in the circumference of the external surface 54 of the ink stick body. However, the guide portions may comprise any number of grooves corresponding to the number of guide rails in the feed channel. Moreover, the guide portions may comprise any disk like protrusion or flange located on a portion of the external surface or the lateral ends that cooperates with the guide rails in the feed channel 28 to maintain the orientation and alignment of the ink stick in the feed channel.

Figure 7:
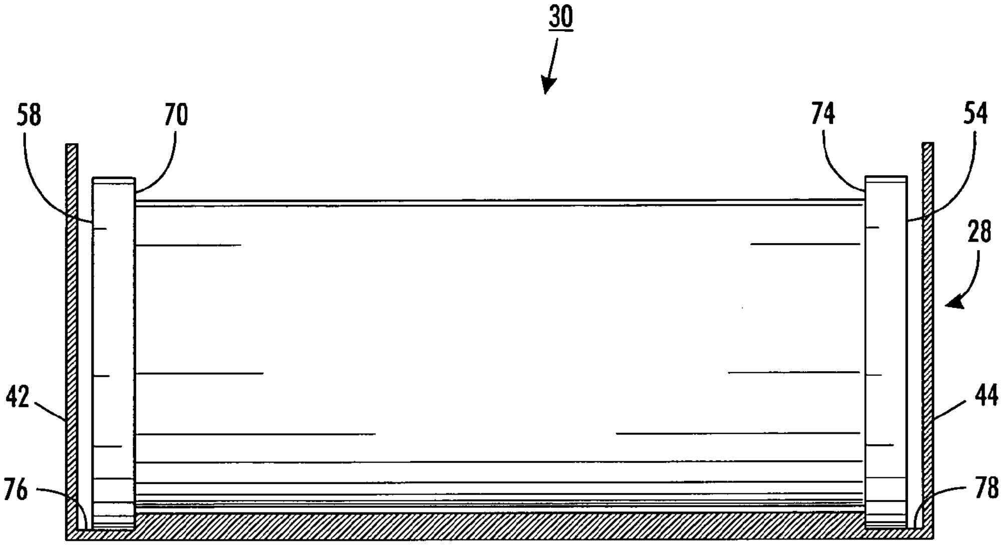
FIG. 7 is a simplified cross-sectional view of an alternative embodiment of the ink stick and feed channel taken along line 4-4 of FIG. 3.

FIG. 7 shows an alternative embodiment of the ink stick wherein the lateral ends comprise disks 70, 74 having a diameter slightly larger than the diameter of the middle portion of the ink stick body. In this embodiment, as mentioned above, the feed channel 28 may include guide grooves 76, 78, or slots, that cooperate with the disks of the lateral ends in order to maintain the orientation of the ink stick in the feed channel 28 with the axis of rotation perpendicular to the longitudinal feed direction of the feed channel 28.

Figure 8:
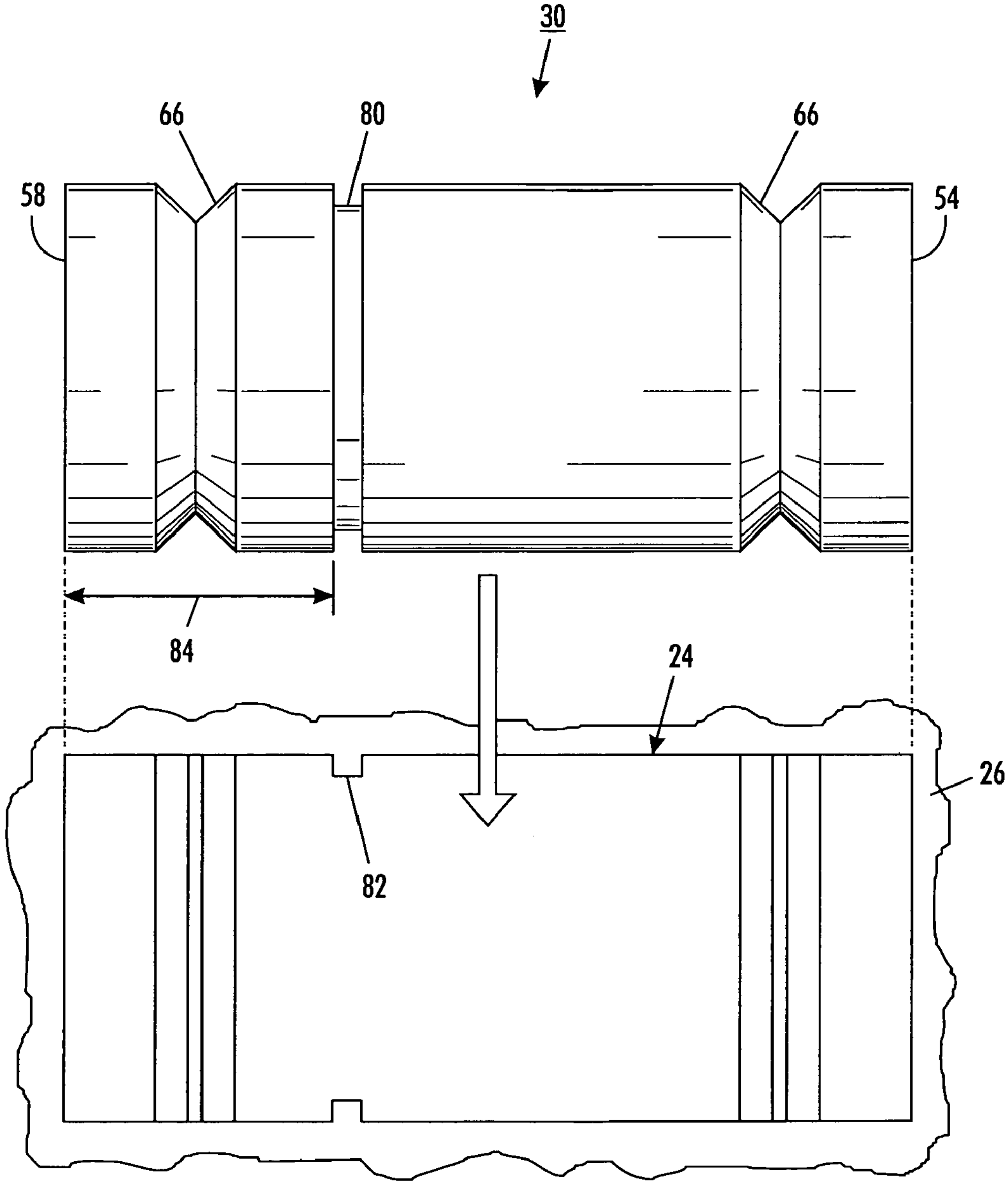
FIG. 8 is an elevational view of the ink stick of FIG. 5 and the corresponding keyed opening of the key plate of the phase change printer of FIGS. 1-3.

The ink sticks shown in FIGS. 5-7 have a longitudinal cross-sectional shape taken at the widest point of the external surface of the ink stick body that corresponds to the shape of the keyed opening 24 of the corresponding feed channel 28 for that particular color. Referring to FIG. 8, the ink stick body 30 includes a key element 80 of a particular predetermined size, shape, and location on the outer perimeter of the ink stick body. In the particular examples illustrated, the ink stick key element 80 is a groove formed in the external surface 54 of the ink stick body where a plane perpendicular to the axis of rotation intersects the external surface of the ink stick body 30 at a predetermined location or distance from one of the lateral ends 54, 58. For an ink stick of a particular color, the ink stick key element 80 matches a complementary key 82A, 82B, 82C, 82D formed in the perimeter of the corresponding keyed opening in the group of keyed openings 24A-D in the key plate. Each color for a printer has a unique arrangement of one or more key elements in the outer perimeter of the ink stick to form a unique cross-sectional shape for that particular color ink stick. The combination of the keyed openings 24A-D in the key plate 26 and the keyed shapes of the ink sticks 30 (formed by the key elements 80) ensure that only ink sticks of the proper color are inserted into each feed channel. A set of ink sticks is formed of an ink stick of each color, with a unique key arrangement for ink sticks of each color.

In the ink stick embodiment shown in FIG. 8, the key element 80 is a groove formed in the circumference of the external surface 54 of the ink stick body. The corresponding complementary key 82 on the perimeter of the keyed opening 24 is a complementary protrusion into the opening. An inwardly directed key element, such as a notch, in the ink stick body 30 provides improved ability to exclude incorrect ink sticks. Only an ink stick with a recess of that particular location, shape, and size (or larger) fits through the keyed opening in the key plate having a key consisting of a corresponding protrusion from the edge of the keyed opening. The key element extends at least approximately 0.04 inch (1 mm) into the ink stick body.

In the embodiment illustrated in FIG. 8, the key element 80 extends around the entire circumference of the external surface. The ink stick can pass through the keyed opening having protrusions at corresponding positions of the keyed opening. The key element 80 on the ink stick body has a particular position with respect to the external surface of the ink stick body. The ink stick key element 80 is located a predetermined distance 84 from one of the lateral ends 54, 58.

As shown in FIG. 8, the key elements 80 comprise grooves in the external surface 54 of the ink stick body 30 at predetermined locations. The key element 80, in other embodiments, may comprise any number of grooves, steps, disk like protrusions or flanges located on a portion of the external surface or the lateral ends. For instance, in some embodiments, the lateral ends 54, 58 may be used as the key elements 80. In these embodiments, the lateral ends may comprise a disk like protrusion at one or both ends. The size of the protrusion or the thickness of the disk may be used as keying elements. Moreover, the lateral end may have grooves, steps, disk like protrusions, or flanges that extend from or recess into the lateral ends.

Figure 9:
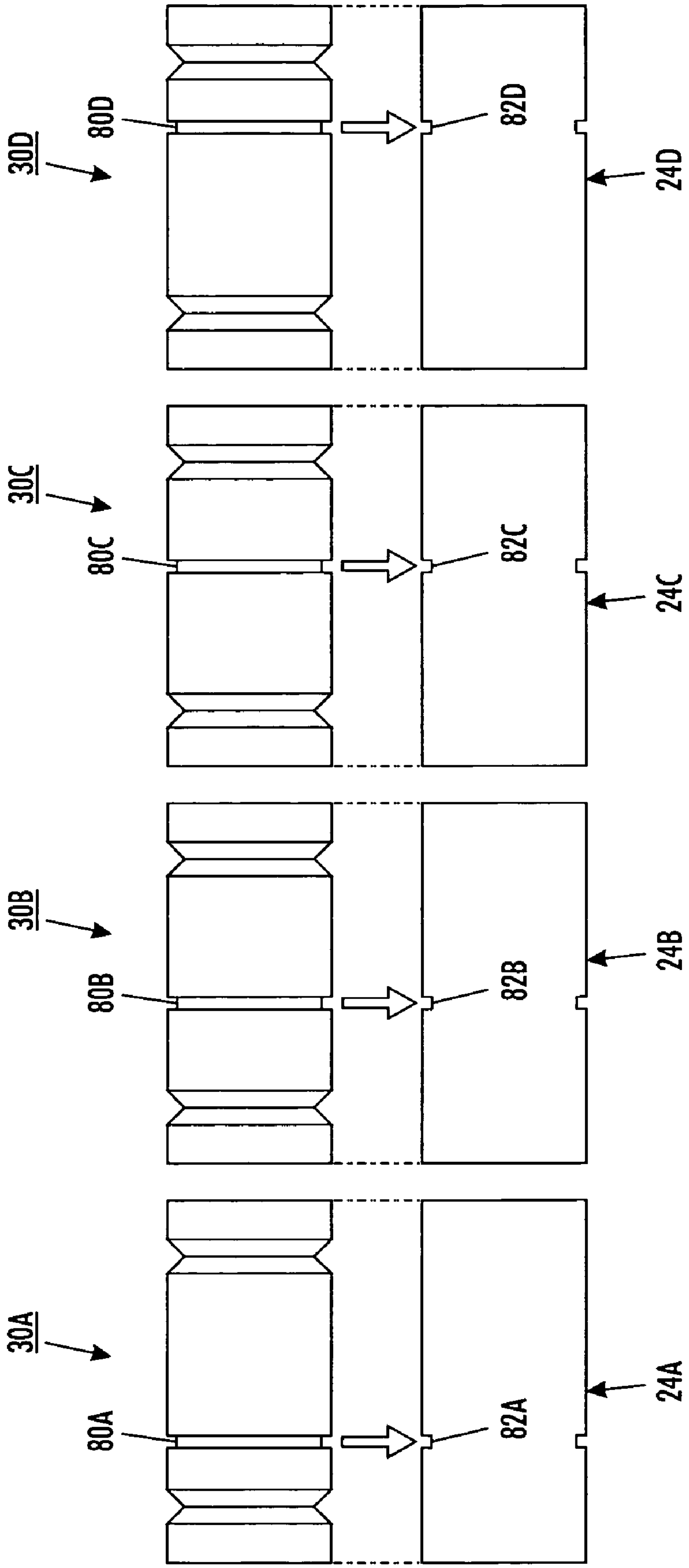
FIG. 9 is an elevational view of a set of ink sticks and the corresponding keyed openings on the key plate for each ink stick.

FIG. 9 shows top views of ink sticks and their corresponding keyed openings in the key plate that may be included in a multi-color set of ink sticks for use in the printer shown in FIGS. 1-3. As can be seen by comparing ink stick shapes of FIG. 9 with the keyed openings 24A-D of the key plate, a set of ink sticks provides a unique one-to-one match between a particular color ink stick and the keyed openings providing access to the four ink stick feed channels 28. Such one-to-one match is provided by including a key element 80 of a single predetermined size and shape at different locations on the external surface of the ink stick body. For example, an ink stick with the key element 80A positioned as shown in FIG. 9 can be inserted into the first keyed opening 24A in the key plate shown in FIG. 2, but cannot be inserted into any of the other keyed openings 24B, 24C, 24D. The keys 82B, 82C, 82D in the keyed openings 24B, 24C, 24D of the key plate and corresponding to the key element positions shown in the ink sticks 30B, 30C, 30D block the ink stick 30A. The ink stick 30B having the key element 80B positioned can be inserted into the second keyed opening 24B of the key plate, but not into the other keyed openings 24A, 24C, 24D. The ink sticks having the key elements 80C, 80D positioned can be inserted into and only into the third and fourth key openings 24C, 24D, which correspond to the third and fourth ink stick feed channels respectively. Thus, the key elements 80A, 80B, 80C, 80D provide discrimination among the different feed channels to stop the user from inserting an ink stick into the incorrect ink stick feed channel.

The common shape and size of the key elements for the ink sticks of a particular set of ink sticks for a printer facilitates manufacture of the ink sticks, and enhances the "family" appearance of the set of ink sticks for that particular printer model. Different shapes and/or sizes of key elements can be used to differentiate ink sticks intended for different models of printers. The ink stick key elements need not all be formed in the longitudinal perimeter segments formed on the lateral side surfaces of the ink stick body. Key elements may also be formed in perimeter segments of the ink stick body that are at least partially transverse longitudinal feed direction. For example, key elements may be formed in the perimeter segments formed by the outermost portions of the lateral ends 54, 58 of the ink stick body.

Figure 10:
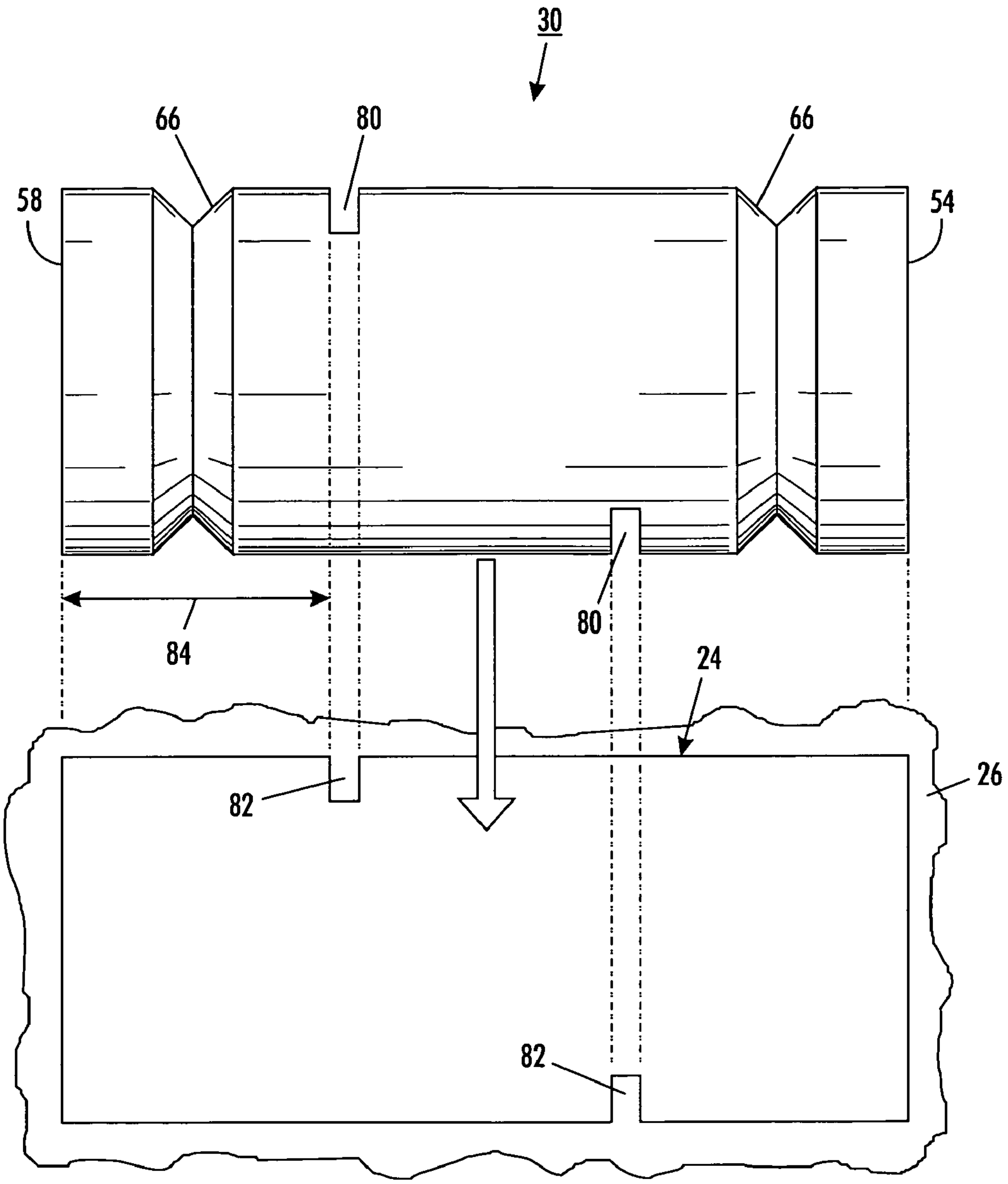
FIG. 10 is an elevational view of another embodiment of the ink stick of FIG. 5 and the corresponding keyed opening of the key plate of the phase change printer of FIGS. 1-3.

In embodiments, further orientation control may be obtained by having the key element 80 extend around only a portion of the circumference of the external surface of the ink stick, as shown in FIG. 10. Multiple ink stick key elements 80 may be arranged to match different arrangements of keys 82.

Figure 11:
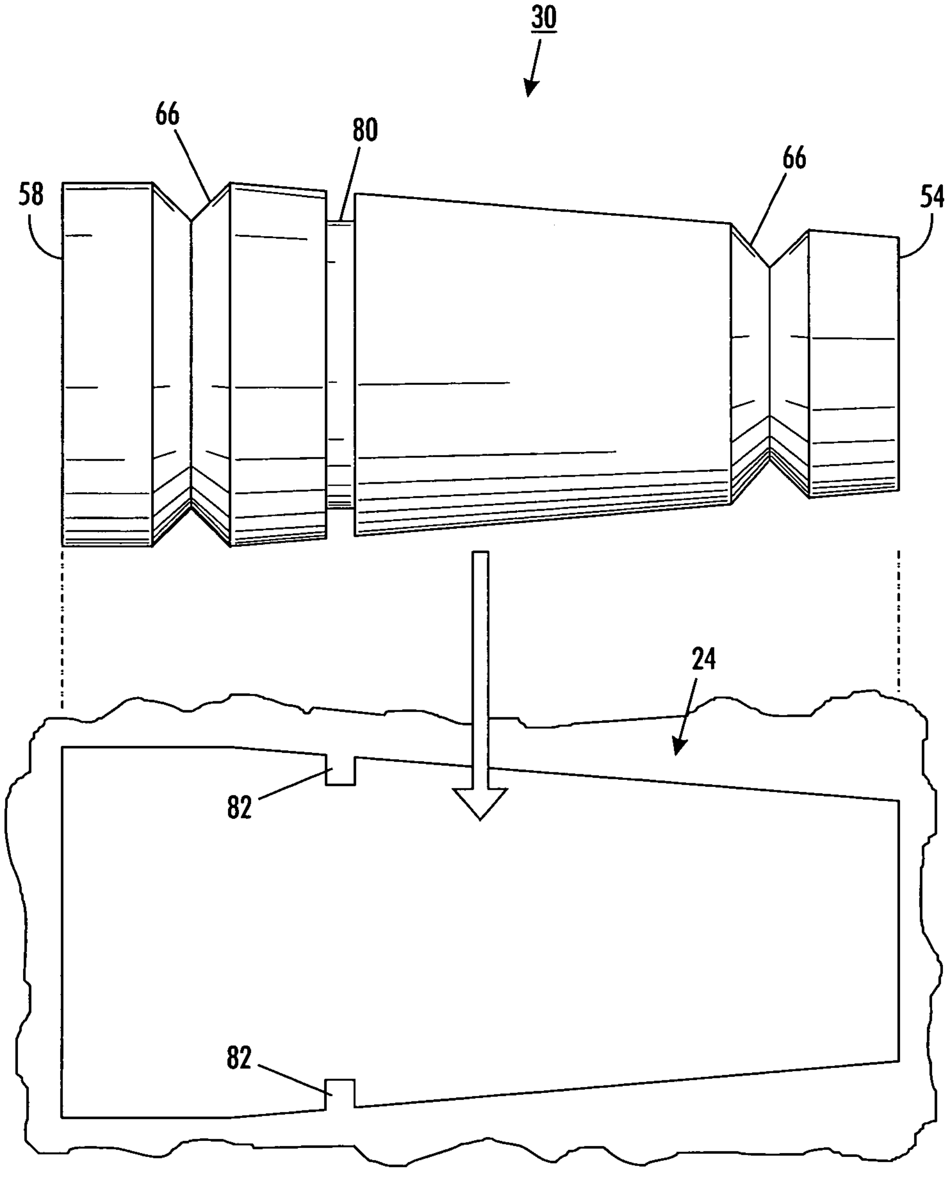
FIG. 11 is an elevational view of another embodiment of the ink stick of FIG. 5 and the corresponding keyed opening of the key plate of the phase change printer of FIGS. 1-3.

The ink stick may be formed in a shape other than a cylinder. In an embodiment shown in FIG. 11, the ink stick 30 is formed in a frusto-conical shape in which the ink stick has the shape of a cone, with the pointed end truncated so that the diameter at one end of the ink stick 54 is smaller than the diameter at the opposite end of the ink stick 58. The corresponding key plate 24 has a matching tapered shape.

Figure 12:
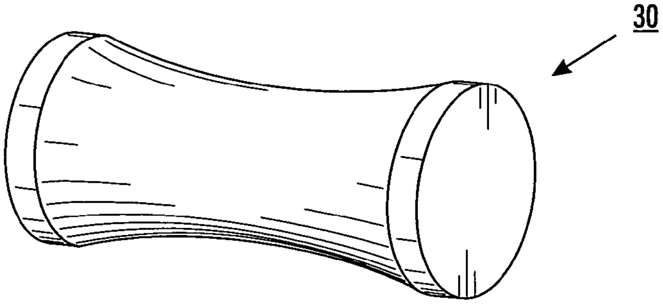
FIG. 12 is an elevational view of another embodiment of the ink stick of FIG. 5.
Figure 13:
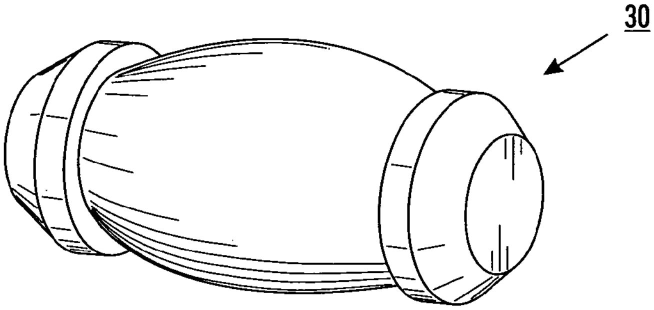
FIG. 13 is an elevational view of another embodiment of the ink stick of FIG. 5.
Figure 14:
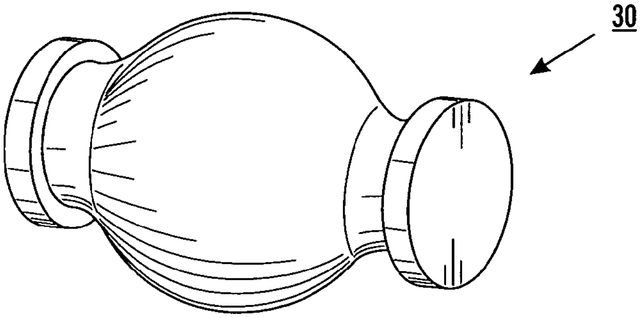
FIG. 14 is an elevational view of another embodiment of the ink stick of FIG. 5.

In other embodiments, the ink stick 30 may be formed in a variety of shapes. In an embodiment shown in FIG. 12, the ends of the ink stick 30 have larger diameters than do segments of the ink stick intermediate the ends. In an embodiment shown in FIG. 13, the ink stick has a somewhat barrel shape, with segments near the ends of the ink stick having smaller diameters than segments of the ink stick near the midpoint. In the particular embodiment illustrated, the ink stick includes guide portions 90 that have diameters larger than the diameters of the immediately adjacent segments of ink stick. The guide portions 90 are shaped to roll along correspondingly shaped guide grooves or slots, similar to the guide grooves 76, 78 shown in FIG. 7 to maintain the orientation of the ink stick with the axis of rotation perpendicular to the feed direction. FIG. 14 shows an embodiment of an ink stick with a somewhat spherical body portion having protruding disk-shaped guide portions 92. The guide portions 92 interact with guide grooves or slots in the feed channel (not shown) to maintain the orientation of the ink stick. The diameter of the guide portions 92 may be smaller (shown) or larger than the diameter of the primary ink stick body portion.

Those skilled in the art will recognize that numerous modifications can be made to the specific implementations described above. Those skilled in the art will recognize that the guide element in the bottom surface of the ink stick body, and the guide rail in the bottom of the feed channel 28 may have numerous shapes other than the particular shapes illustrated. In addition, numerous other configurations of the feed channel, key plate, and other components of the ink feed system can be constructed within the scope of the invention. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An ink stick for use in a phase change ink jet printer, wherein the ink jet printer has an ink feed channel having a feed direction leading to a melt plate, the ink stick comprising:

an ink stick body having an external surface and an axis of rotation about which the ink stick body rotates as the ink stick body moves through the ink feed channel;

wherein the ink stick body is adapted for insertion into the ink feed channel so that the axis of rotation is oriented substantially perpendicular to the feed direction;

wherein at least a first portion of the external surface of the ink stick body forms a circle on a plane that is substantially perpendicular to the axis of rotation; and wherein a second portion of the external surface in a plane that is substantially perpendicular to the axis of rotation contains an insertion key in a portion of the external surface of the ink stick body.

2. The ink stick of claim 1, wherein the ink stick body is adapted for insertion into the feed channel so that the axis of rotation is also oriented substantially perpendicular to gravitational force.

3. The ink stick of claim 1, wherein the feed direction is substantially perpendicular to gravitational force.

4. The ink stick of claim 1, wherein the insertion key comprises a portion of the external surface of the ink stick body that forms a shape other than a circle on a plane that is substantially perpendicular to the axis of rotation.

5. The ink stick of claim 1, wherein a first portion of the external surface forms a circle on a first plane having a first diameter;

a second portion of the external surface forms a circle on a second plane having a second diameter; and the first and second planes are axially spaced from one another along the axis of rotation.

6. The ink stick of claim 5, wherein the first and second diameters are substantially the same.

7. The ink stick of claim 5, wherein the first and second diameters are different.

8. The solid ink stick of claim 1, wherein the ink stick body has a generally cylindrical tape apart from the insertion key.

9. The solid ink stick of claim 1, wherein the ink stick body has generally spherical shape apart from the insertion key.

10. The solid ink stick of claim 1, wherein the insertion key comprises a notch in the external surface of the ink stick body.

11. The solid ink stick of claim 1, wherein the insertion key comprises a flange.

12. The solid ink stick of claim 1, wherein the insertion key comprises a disk-like protuberance.

13. An ink stick for use in a phase change ink jet printer, the ink stick comprising:

an ink stick body having a cylindrical shape and an axis of rotation that passes through a longitudinal center of the cylindrically shaped ink stick body and about which the ink stick body rotates as the ink stick body passes through the feed channel;

wherein the cylindrically shaped ink stick body has an external surface with a guide portion that is configured to engage a guide rail oriented approximately perpendicular to gravitational force in a feed channel of the phase change ink jet printer to guide the ink stick in a feed direction along the feed channel; and wherein the guide portion of the external surface has a substantially circular circumference that is centered on the axis of rotation and is not equal to a circular circumference of the cylindrically shaped ink stick body.

14. The ink stick of claim 13, wherein the guide portion of the external surface is formed where a plane perpendicular to the axis of rotation intersects the external surface of the ink stick body.

15. The ink stick of claim 13, further comprising a second guide portion of the external surface adapted to engage a second guide rail oriented substantially parallel to the first guide rail in the feed channel, wherein:

the second guide portion of the external surface has a substantially circular circumference that is centered on the axis of rotation and is not equal to the circular circumference of the cylindrically shaped ink stick body; and the second guide portion is spaced apart from the first guide portion along the axis of rotation.

16. The ink stick of claim 15, wherein:

the first guide portion of the external surface is formed where a first plane perpendicular to the axis of rotation intersects the external surface of the ink stick body; and the second guide portion of the external surface is formed where a second plane perpendicular to the axis of rotation intersects the external surface of the ink stick body.

17. The ink stick of claim 16, wherein:

the first plane is spaced from the second plane by a distance that is at least one third the cylindrical ink stick body length.

18. The ink stick of claim 16 wherein:

the first plane is spaced from the second plane by a distance that is at least one half the cylindrical ink stick body length.

19. A set of solid ink sticks for use in a phase change ink jet printer having first and second feed channels, the set of solid ink sticks comprising:

a first ink stick body having a first guide portion with a circular circumference that is centered about an axis of rotation around which the first ink stick body rotates as the first ink stick body passes through the first feed channel;

a second ink stick body having a second guide portion with a circular circumference that is centered about an axis of rotation around which the second ink stick body rotates as the second ink stick body passes through the second feed channel;

wherein the first ink stick body includes a first insertion key and the second ink stick body includes a second insertion key, the first insertion key having a shape that is different from the second insertion key shape;

the first guide portion being configured to fit in the first feed channel of the phase change ink jet printer; and the second portion being configured to fit in the second feed channel of the phase change ink jet printer.

20. The set of solid ink sticks of claim 19, wherein:

the first insertion key is arranged on the first ink stick body to disable the first ink stick from fitting into the second feed channel; and the second insertion key is arranged on the second ink stick body to disable the second ink stick from fitting into the first feed channel.

21. The set of solid ink sticks of claim 19, wherein:

the first ink stick body is frusto-conical; and the second ink stick body is frusto-conical.

22. The set of solid ink sticks of claim 21, wherein the first and second ink stick bodies are cylindrical.

23. A method of inserting ink sticks into one of a plurality of feed channels of a phase change ink jet printer, wherein each teed channel has an insertion end and a melt end, with a feed direction extending from the insertion end toward the melt end, and wherein the insertion end has an insertion opening having a unique shape, the method comprising:

identifying an axis of rotation for an ink stick about which the ink stick rotates as the ink stick moves through a feed channel;

orienting the ink stick so that the axis of rotation is substantially perpendicular to the feed direction;

aligning an insertion key of the ink stick with a keyed opening in the insertion opening;

inserting the ink stick through the insertion opening and the insertion key through the keyed opening to place the ink stick into the insertion end of the feed channel; and rolling the ink stick along the first feed channel in the feed direction toward the melt end with the axis of rotation of the ink stick remaining substantially perpendicular to the feed direction.

24. The method of claim 23, wherein:

inserting the ink stick through the insertion opening comprises inserting the ink stick in an insertion direction through the insertion opening; and orienting the ink stick additionally comprises orienting the ink stick so that the axis of rotation is substantially perpendicular to the insertion direction.

25. The method of claim 24, wherein the insertion direction and the feed direction are substantially perpendicular to one another.

* * * * *